(12) United States Patent
Ueda et al.

(10) Patent No.: US 10,746,299 B2
(45) Date of Patent: Aug. 18, 2020

(54) VEHICLE WITH AUTOMATIC DOWNSHIFT FUNCTION

(71) Applicant: KAWASAKI JUKOGYO KABUSHIKI KAISHA, Kobe-shi, Hyogo (JP)

(72) Inventors: Kengo Ueda, Akashi (JP); Hiroki Tominaga, Kobe (JP)

(73) Assignee: KAWASAKI JUKOGYO KABUSHIKI KAISHA, Kobe-shi. Hyogo (JP)

( * ) Notice: Subject to any disclaimer, the term of this patent is extended or adjusted under 35 U.S.C. 154(b) by 92 days.

(21) Appl. No.: 16/173,834

(22) Filed: Oct. 29, 2018

(65) Prior Publication Data
US 2019/0128418 A1 May 2, 2019

(30) Foreign Application Priority Data
Nov. 2, 2017 (JP) .................. 2017-212822

(51) Int. Cl.
*F16H 63/50* (2006.01)
*F02D 37/02* (2006.01)
*F16H 61/04* (2006.01)
*F02D 41/02* (2006.01)
*F16H 59/68* (2006.01)
(Continued)

(52) U.S. Cl.
CPC ........... *F16H 63/502* (2013.01); *F02D 37/02* (2013.01); *F02D 41/023* (2013.01); *F16H 61/04* (2013.01); *B60Y 2200/12* (2013.01); *F02D 41/0225* (2013.01); *F02D 2200/101* (2013.01);
(Continued)

(58) Field of Classification Search
CPC ...... F16H 63/502; F16H 61/04; F02D 41/023; F02D 37/02; F02D 2200/101; F02D 41/005
See application file for complete search history.

(56) References Cited

U.S. PATENT DOCUMENTS 5,921,886 A * 7/1999 Takada ............... B60W 10/06
477/101
2005/0239597 A1* 10/2005 Shimada ............ B60W 10/06
477/107
(Continued)

FOREIGN PATENT DOCUMENTS

JP 200677623 A 3/2006

*Primary Examiner* — Stacey A Fluhart
(74) *Attorney, Agent, or Firm* — Alleman Hall Creasman & Tuttle LLP (57) ABSTRACT

A vehicle with an automatic downshift function, comprises an engine including a throttle device and an ignition device; an engine speed sensor which detects an engine speed; a shift operation member which is operated by a rider; a manual transmission connected to the engine, a shift operation sensor which detects the operation of the shift operation member; and a controller which controls the engine based on a detection signal of the engine speed sensor and a detection signal of the shift operation sensor. In a case where the controller determines that a deceleration shift operation has been initiated based on the detection signal of the shift operation sensor, the controller performs an automatic downshift control so that the controller controls the throttle device to increase an intake-air amount and controls the ignition device to change an ignition timing, based on the engine speed detected by the engine speed sensor.

7 Claims, 6 Drawing Sheets (51) Int. Cl.
*F16H 59/36* (2006.01)
*F16H 59/70* (2006.01)

(52) U.S. Cl.
CPC .............. *F16H 59/68* (2013.01); *F16H 59/70* (2013.01); *F16H 2059/366* (2013.01); *F16H 2061/0474* (2013.01)

(56) References Cited

U.S. PATENT DOCUMENTS

| | | | |
|---|---|---|---|
| 2006/0068975 A1 | 3/2006 | Kobayashi et al. | |
| 2008/0146412 A1* | 6/2008 | Sagawa ................ | B60W 10/06 477/108 |
| 2008/0275612 A1* | 11/2008 | Vesenjak ............... | B60W 10/06 701/54 |

* cited by examiner

VEHICLE WITH AUTOMATIC DOWNSHIFT FUNCTION

CROSS-REFERENCE TO THE RELATED APPLICATION

This application claims priority to and the benefit of Japanese Patent Application No. 2017-212822 filed on Nov. 2, 2017, the entire disclosure of which is incorporated herein by reference.

BACKGROUND OF THE INVENTION

Field of the Invention

The present invention relates to a vehicle with an automatic downshift function, which is capable of smooth deceleration (speed reduction) shift without operating a main clutch.

Description of the Related Art

In a conventional example of a vehicle such as a motorcycle, which is equipped with a manual transmission of a dog clutch type, a clutch is disengaged, a shift pedal is operated, and then a transmission gear position is changed, in speed change (transmission) shift. In contrast, Japanese Laid-Open Patent Application Publication No. 2006-77623 discloses a control technique which can realize speed change with a less impact (shock) without a need to operate a main clutch by a clutch lever. In this disclosure, an intake-air amount is increased upon beginning of the deceleration (speed reduction) shift of the manual transmission, and the rotation speeds of a gear and a dog which are next to be engaged with each other, in a state in which all gears are placed in a driving power cut-off state in a transit stage of a deceleration shift operation are made close to each other. This allows the dog to be smoothly engaged with the gear without disengaging the main clutch. In this way, quick speed change occurs.

However, in this disclosure, engine power is increased to reach target power by an intake-air amount control which is relatively low in a power responsivity, in the deceleration shift. Therefore, it is difficult to quickly perform fine adjustment of the engine power. In this case, for example, in a motorcycle, a transmission gear ratio difference which is caused by the deceleration (speed reduction) shift is different among transmission gear positions. Therefore, in a certain transmission gear position, the smooth speed change operation cannot be performed.

SUMMARY OF THE INVENTION

In view of the above-described circumstances, an object of the present invention is to provide a configuration which can realize smooth deceleration (speed reduction) shift without operating a main clutch, irrespective of a transmission gear position.

According to an aspect of the present invention, a vehicle with an automatic downshift function, comprises an engine including a throttle device and an ignition device; an engine speed sensor which detects an engine speed; a shift operation member which is operated by a rider to perform speed change; a manual transmission connected to the engine, the manual transmission being configured to select one of gears corresponding to a plurality of transmission gear positions, respectively, in response to an operation of the shift operation member performed by the rider, and to place the selected gear in a driving power transmission state; a shift operation sensor which detects the operation of the shift operation member performed by the rider; and a controller which controls the engine based on a detection signal of the engine speed sensor and a detection signal of the shift operation sensor, wherein in a case where the controller determines that a deceleration shift operation has been initiated based on the detection signal of the shift operation sensor, the controller performs an automatic downshift control so that the controller controls the throttle device to increase an intake-air amount of the engine and controls the ignition device to change an ignition timing, based on the engine speed detected by the engine speed sensor.

In accordance with this configuration, since the controller causes the throttle device to adjust the intake-air amount and causes the ignition device to adjust the ignition timing to increase the engine power in the deceleration (speed reduction) shift, it becomes possible to adjust the engine power with a high responsivity by the ignition timing adjustment which is high in power responsivity while sufficiently addressing a great change of the target engine power by the intake-air amount adjustment. This allows the rider to smoothly perform the speed change operation irrespective of the transmission gear position. As a result, smooth deceleration (speed reduction) shift can be performed without operating a main clutch.

The vehicle with the automatic downshift function may further comprise: a gear position sensor which detects a transmission gear position selected from among the plurality of transmission gear positions, wherein in a case where the controller determines that the deceleration shift operation has been initiated, the controller may control the throttle device to increase the intake-air amount of the engine based on the engine speed detected by the engine speed sensor without reference to the transmission gear position detected by the gear position sensor, and may control the ignition device to change the ignition timing based on the transmission gear position detected by the gear position sensor.

In accordance with this configuration, the increase amount of the intake-air in the deceleration (speed reduction) shift can be set without referring to the transmission gear position detected by the gear position sensor. Therefore, a throttle control can be simplified.

In a case where the controller determines that the deceleration shift operation has been initiated, the controller may control the ignition device to change a phase of the ignition timing and may decide a phase change amount of the ignition timing based on the transmission gear position detected by the gear position sensor.

In accordance with this configuration, since the engine power reaches the target power by increasing the intake-air amount and changing the phase of the ignition timing, in the deceleration (speed reduction) shift, the engine power can be easily finely adjusted, and smoothness of the deceleration (speed reduction) shift can be improved.

The controller may change a phase of the ignition timing by retarding the ignition timing and increases a retard amount of the ignition timing as the transmission gear position in deceleration shift is higher.

In accordance with this configuration, the engine power can reach the target power by retarding the ignition timing in a case where the increase amount of the intake-air is excessive for the engine target power in the deceleration (speed reduction) shift, the engine power can be easily finely adjusted, and smoothness of the deceleration (speed reduction) shift can be improved.

In a case where a transmission gear ratio difference in deceleration shift is maximum, the controller may control the throttle device to increase the intake-air amount of the engine without changing the ignition timing of the ignition device, and in a case where the transmission gear ratio difference in the deceleration shift is not maximum, the controller may control the ignition device to retard the ignition timing.

In a case where the phase of the ignition timing is changed in the deceleration shift, a retard range of the ignition timing which is a wide allowable range is used without using an advancement range of the ignition timing which is a narrow allowable range. Thus, a great adjustment width of the ignition timing can be secured.

In a case where a predetermined control condition is met, the controller may perform the automatic downshift control, and the predetermined condition may include a condition in which a speed of the vehicle is higher than a first threshold, the engine speed is higher than a second threshold and lower than a third threshold, and a throttle opening rate of the throttle device is less than a fourth threshold.

In accordance with this configuration, unnecessary execution of the control can be avoided, and an unnecessary change of the engine power can be prevented.

In a case where the controller determines that the deceleration shift operation has been completed, the controller may control the ignition device so that the ignition timing gradually returns to an ignition timing in a normal state over time.

In accordance with this configuration, the power change at a time point just after the completion of the deceleration (speed reduction) shift can be suppressed, and smoothness of the deceleration shift can be further improved.

The above and further objects, features and advantages of the present invention will more fully be apparent from the following detailed description of preferred embodiment with reference to the accompanying drawings.

DETAILED DESCRIPTION OF THE PREFERRED EMBODIMENTS

Hereinafter, the embodiments of the present invention will be described with reference to the drawings. The stated directions are from the perspective of a rider riding in a motorcycle.

Embodiment 1

Figure 1:
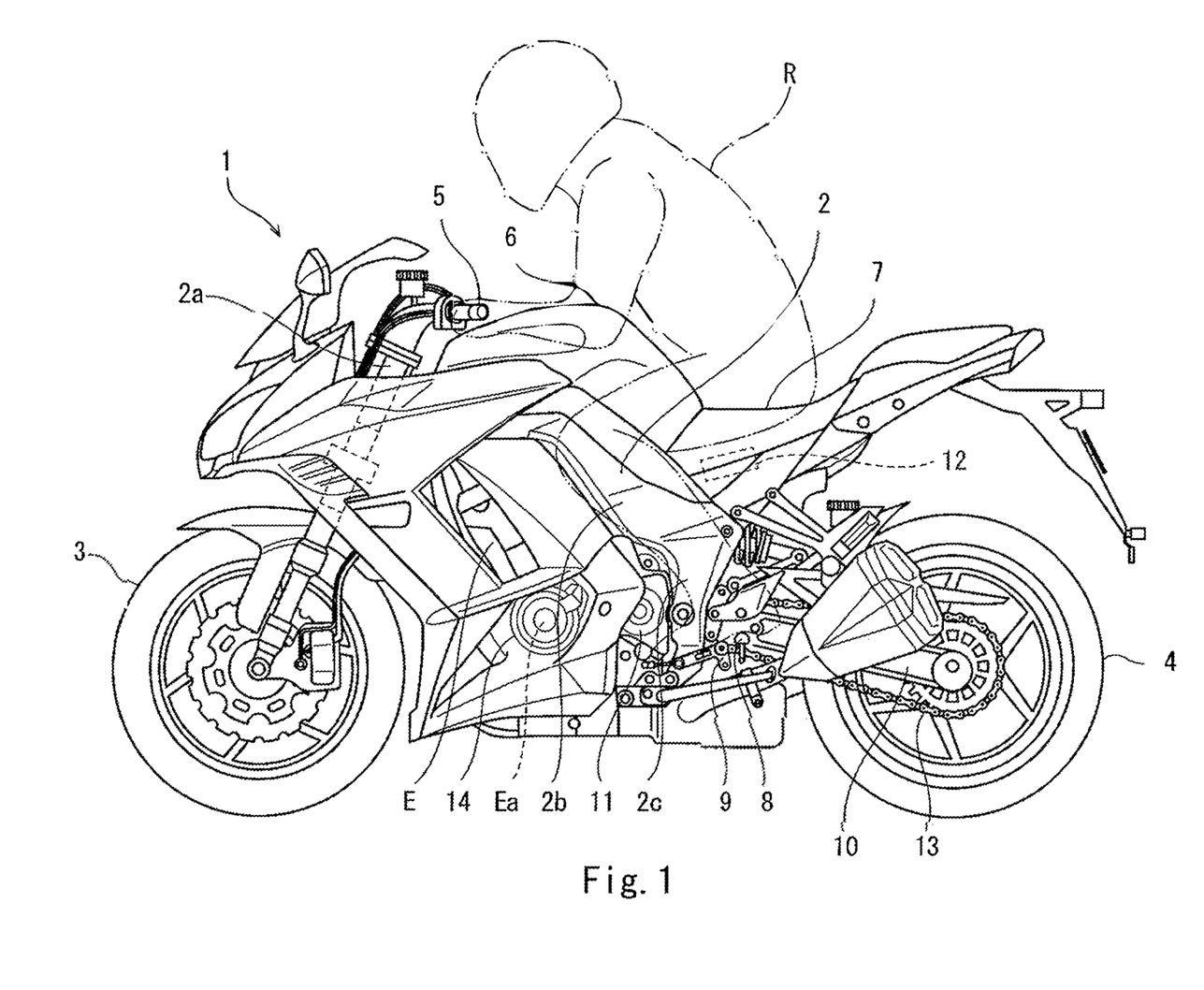
FIG. 1 is a left side view of a motorcycle according to Embodiment 1.

FIG. 1 is a left side view of a motorcycle 1 according to Embodiment 1. Referring now to FIG. 1, the motorcycle 1 has an automatic downshift function which is capable of speed change with a less impact (shock) without operating a main clutch by a clutch lever. The motorcycle 1 includes a vehicle body frame 2, a front wheel 3 supported by the vehicle body frame 2, and a rear wheel 4 supported by the vehicle body frame 2. The front wheel 3 is a driven wheel and the rear wheel 4 is a drive wheel.

The vehicle body frame 2 includes a head pipe 2a, a main frame 2b extending rearward from the head pipe 2a, and a pivot frame 2c connected to the rear portion of the main frame 2b. The head pipe 2a supports a steering shaft (not shown) connected to a bar handle 5 which can be gripped by a rider so that the steering shaft is rotatable. By the rotation of the steering shaft, the front wheel 3 is steered to the right or the left.

A fuel tank 6 is disposed on the upper side of the main frame 2b at a location that is rearward of the handle 5. A seat 7 which can be straddled by the rider is disposed rearward of the fuel tank 6. Step members 8 are disposed below and on the right and left sides of the seat 7. The rider's feet are put on the step members 8, respectively. A shift operation member (shift lever) 9 is disposed in the vicinity of the step member 8. The shift operation member 9 is operated by the rider's foot put on the step member 8. The front end portion of a swing arm 10 is mounted on the pivot frame 2c so that the swing arm 10 is pivotable. The rear wheel 4 is rotatably mounted on the rear end portion of the swing arm 10.

Between the front wheel 3 and the rear wheel 4, an engine E is disposed. The engine E is supported by the main frame 2b and the pivot frame 2c. A manual transmission 11 is connected to the output shaft of the engine E and is able to transmit the driving power to the rear wheel 4. The driving power output from the manual transmission 11 is transmitted to the rear wheel 4 via a driving power transmission member 13 (e.g., chain or belt). A crankshaft Ea of the engine E is accommodated in a crankcase 14 supported by the vehicle body frame 2. The manual transmission 11 is also accommodated in the crankcase 14. Thus, the crankcase 14 also serves as a transmission case.

A controller 12 (ECU) is disposed below the seat 7 and configured to control the engine E. The controller 2 includes a processor, a volatile memory, a non-volatile memory, an I/O interface, and the like. The controller 12 is configured to control the engine E in such a way that the processor performs calculation (computation) by use of the volatile memory according to a program stored in the non-volatile memory and outputs a control signal corresponding to a detection signal of each of sensors.

Figure 2:
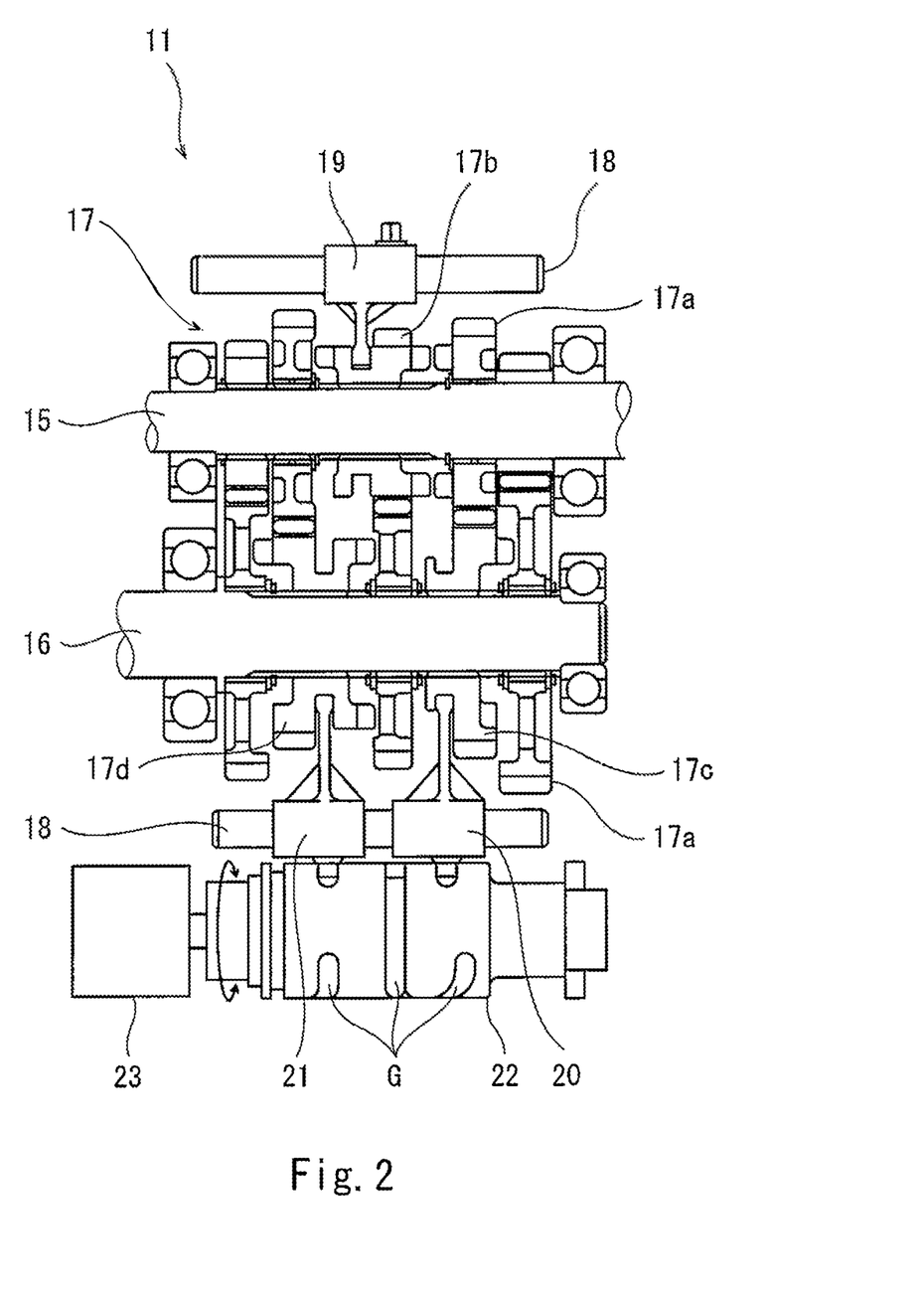
FIG. 2 is a cross-sectional view taken along a plane passing through shafts of a manual transmission of the motorcycle of FIG. 1.

FIG. 2 is a cross-sectional view of the manual transmission 11 of the motorcycle 1 of FIG. 1, which is sectioned along a plane passing through shafts. Referring to FIG. 2, the manual transmission 11 is capable of transmitting the driving power from an input shaft 15 to an output shaft 16 via selected one of plural sets of gear trains 17 with different reduction gear ratios. The manual transmission 11 is a dog gear transmission configured to select one of the plural sets of gear trains 17 and to perform the speed change. The driving power is transmitted from a crankshaft Ea of the engine E (see FIG. 1) to the input shaft 15 of the manual transmission 11 via a main clutch (not shown). The driving power transmission member 13 (see FIG. 1) is provided at a first end portion (e.g., left end portion) of the output shaft 16 in the vehicle width direction. The driving power transmission member 13 is configured to transmit the driving power of the output shaft 16 to the rear wheel 4.

The manual transmission 11 is provided with a gear shifter 18 which performs speed change in such a manner that the gear shifter 18 mechanically responds to the rider's operation of the shift operation member 9 (see FIG. 1), selects one from among plural sets of gear trains 17, and shifts the driving power transmission path. The gear shifter 18 includes a gear 17a which is rotatably fitted to the input shaft 15 or the output shaft 16, a dog gear 17b which is slidably provided at the input shaft 15 and is engageable with selected one from among the plural sets of gear trains 17, dog gears 17c, 17d which are slidably provided at the output shaft 16 and are engageable with selected one from among the plural sets of gear trains 17, a shift fork 19 which moves the dog gear 17b along the input shaft 15, shift forks 20, 21 which move the dog gears 17c, 17d along the output shaft 16, and a shift drum 22 which operates the shift forks 19 to 21.

In the manual transmission 11, the shift forks 19 to 21 are slidably supported by support shafts 18 disposed in parallel with the input shaft 15 and the output shaft 16. The first end portion of the shift fork 19 is connected to the dog gear 17b of the input shaft 15. The first end portions of the shift forks 20, 21 are connected to the dog gears 17c, 17d, respectively, of the output shaft 16. The second end portions of the shift forks 19 to 21 are fitted to guide grooves respectively, of the shift drum 22.

The shift drum 22 mechanically responds to the rider's operation of the shift operation member 9 (see FIG. 1) and rotates. Thereby, the shift forks 19 to 21 are guided to the corresponding guide grooves and slide the corresponding dog gears 17b to 17d along the input shaft 15 or the output shaft 16. In this state, the gear train 17 corresponding to a reduction gear ratio desired by the rider is placed in a driving power transmission state. In this way, a driving power transmission path of a desired transmission gear position is selected. A gear position sensor 23 is engaged with the output shaft 16.

Figure 3:
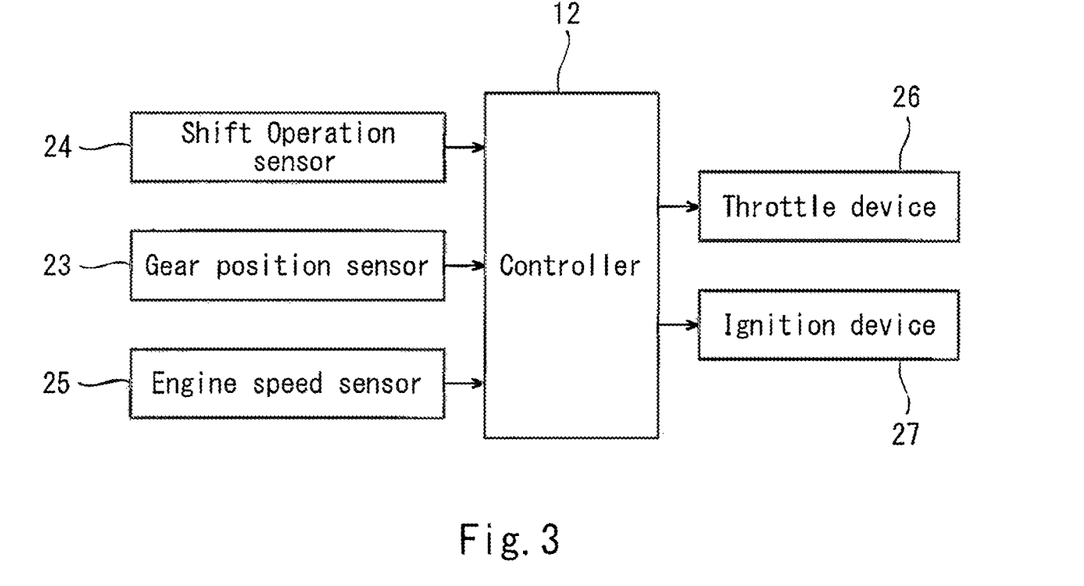
FIG. 3 is a block diagram of a control system of the motorcycle of FIG. 1.

FIG. 3 is a block diagram of a control system of the motorcycle 1 of FIG. 1. As shown in FIG. 3, the controller 12 receives as inputs detection signals from a shift operation sensor 24, the gear position sensor 23, and an engine speed sensor 25. The shift operation sensor 24 is connected to the shift operation member 9 and configured to detect a motion of the shift operation member 9. For example, the shift operation sensor 24 is a displacement meter (e.g., Hall IC) or a load meter. For example, in a case where the rider performs a deceleration (speed reduction) shift operation of the shift operation member 9, the shift operation sensor 24 outputs one of positive and negative detection signals. On the other hand, in a case where the rider performs an acceleration (speed increase) shift operation of the shift operation member 9, the shift operation sensor 24 outputs the other of the positive and negative detection signals. The gear position sensor 23 is configured to detect a rotation angle of the shift drum 22, to detect a transmission gear position selected from among the plural sets of gear trains 17 of the plural transmission gear positions of the manual transmission 11. The engine speed sensor 25 is configured to detect a crank angle of the crankshaft Ea of the engine E to detect the engine speed.

The controller 12 is configured to output the control signals to a throttle device 26 which adjusts an intake-air amount of the engine E and to an ignition device 27 (ignition plug) which ignites an air-fuel mixture present inside a combustion chamber of the engine E. The throttle device 26 is an electronically controlled throttle device which opens and closes a throttle valve by a driving motor. Specifically, the controller 12 is configured to control the throttle device 26 and the ignition device 27 based on the detection signal received from the shift operation sensor 24, the detection signal received from the gear position sensor 23, and the detection signal received from the engine speed sensor 25, to adjust the intake-air amount and the ignition timing. In the present embodiment, in a case where the controller 12 determines that the deceleration (speed reduction) shift operation has been initiated based on the detection signal received from the shift operation sensor 24, the controller 12 executes an automatic downshift control based on the transmission gear position detected by the gear position sensor 23 and the engine speed detected by the engine speed sensor 25 in such a manner that the controller 12 controls the throttle device 26 to increase the intake-air amount of the engine E, and controls the ignition device 27 to change the ignition timing.

Figure 4:
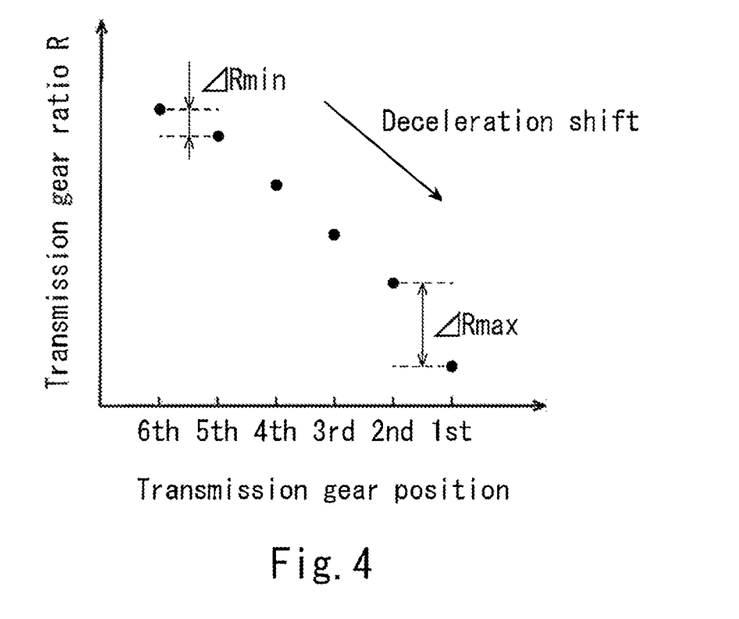
FIG. 4 is a view showing a relation between a transmission gear position and a transmission gear ratio of a manual transmission of FIG. 2.

FIG. 4 is a view showing a relation between the transmission gear position and the transmission gear ratio of the manual transmission 11 of FIG. 2. As shown in FIG. 4, in the manual transmission 11, a difference in the transmission gear ratio R which is caused by the speed change shift is different among the transmission gear positions. In the manual transmission 11, for example, among transmission gear ratio differences $\Delta R$, a difference $\Delta R_{max}$ between the transmission gear ratio of a 2nd gear position and the transmission gear ratio of a 1st gear position is maximum (largest), and a difference $\Delta R_{min}$ between the transmission gear ratio of a 6th gear position and the transmission gear ratio of a 5th gear position is minimum (smallest). In light of this, in a case where the automatic downshift control for increasing the engine speed so that the rotation speeds of the gear 17a and one of the dog gears 17b to 17d, which are next to be engaged with each other, in a driving power cut-off state in a transit stage of the deceleration (speed reduction) shift operation are made close to each other is performed, it is necessary to change the increase amount of the engine speed based on the transmission gear ratio difference $\Delta R$. Specifically, the increase amount of the engine speed is set to be larger in a case where the transmission gear ratio difference $\Delta R$ is larger than in a case where the transmission gear ratio difference $\Delta R$ is smaller. In addition, it is necessary to adjust the increase amount of the engine speed based on the value of the engine speed detected by the engine speed sensor 25, in the deceleration shift operation.

Figure 5:
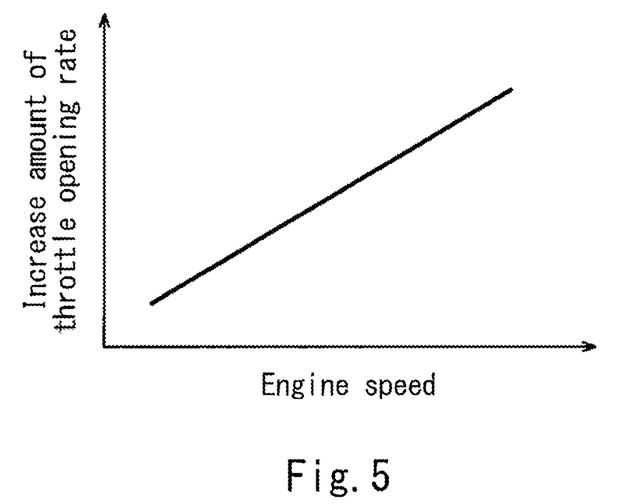
FIG. 5 is a view showing a relation between an increase amount of a throttle opening rate (throttle opening degree) and an engine speed, in an automatic downshift control performed by the controller of FIG. 3.

FIG. 5 is a view showing a relation between an increase amount of the throttle opening rate (throttle opening degree) and the engine speed in the automatic downshift control performed by the controller 12 of FIG. 3. Referring to FIG. 5, in a case where the controller 12 determines that the deceleration (speed reduction) shift has been initiated based on the detection signal received from the shift operation sensor 24, the controller 12 controls the throttle device 26 so that the throttle opening rate is increased in a case where the deceleration shift operation is performed than in a case where the deceleration shift operation is not performed. In this case, the controller 12 decides the value of the increase amount of the throttle opening rate (intake-air amount) based on the engine speed detected by the engine speed sensor 25 without referring to the detection signal of the gear position sensor 23. Specifically, the controller 12 decides the target value of the increase amount of the throttle opening rate irrespective of the transmission gear position in the deceleration shift, and increases this target value with an increase in the engine speed according to the correlation of FIG. 5.

Figure 6:
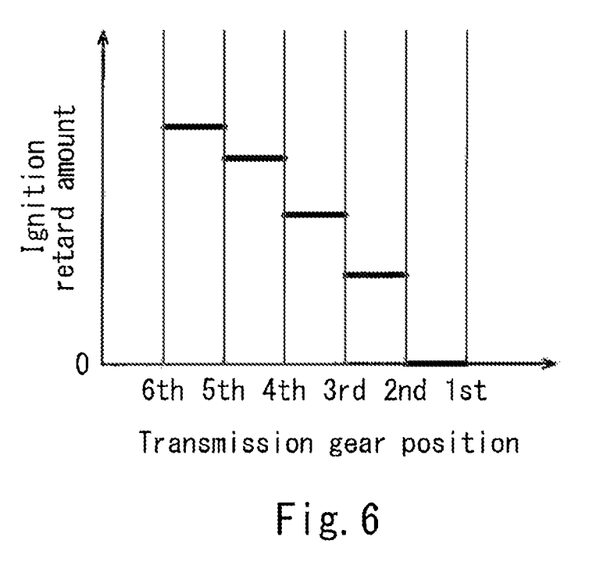
FIG. 6 is a view showing a relation between an ignition retard amount and a transmission gear position, in the automatic downshift control performed by the controller of FIG. 3.

FIG. 6 is a view showing a relation between an ignition retard amount and the transmission gear position in the automatic downshift control performed by the controller 12 of FIG. 3. Referring to FIG. 6, in a case where the controller 12 determines that the deceleration (speed reduction) shift operation has been initiated based on the detection signal received from the shift operation sensor 24, the controller 12 retards the ignition timing based on the transmission gear position in the deceleration shift, concurrently with increasing the throttle opening rate (while increasing the throttle opening rate). Specifically, in the case of the deceleration shift from the 2nd gear position to the 1st gear position, at which the transmission gear ratio difference $\Delta R$ is maximum ($\Delta R_{max}$), the controller 12 increases the engine speed by increasing only the throttle opening rate without changing the ignition timing. In other cases (in the deceleration shift from the 6th gear position to the 5th gear position, from the 5th gear position to the 4th gear position, from the 4th gear position to the 3rd gear position, and from the 3rd gear position to the 2nd gear position), the increase amount of the engine speed corresponding to the increase amount of the throttle opening rate which is set according to as a reference the deceleration shift from the 2nd gear position to the 1st gear position, is compensated to be reduced by retarding the ignition timing. In this way, the value of the increase amount of the engine speed can be adjusted to a value which is suitable for each transmission gear position. In that case, the ignition retard amount is set to be increased as the transmission gear position detected by the gear position sensor 23 in the deceleration shift is higher.

Specifically, in a case where the transmission gear ratio difference $\Delta R$ in the deceleration shift is maximum ($\Delta R_{max}$), the controller 12 controls the throttle device 26 to increase the intake-air amount of the engine E without changing the ignition timing of the ignition device 27. In other cases where the transmission gear ratio difference $\Delta R$ is not $\Delta R_{max}$, the controller 12 controls the ignition device 27 to retard the ignition timing to cancel an excessive increase amount of the engine speed corresponding to the increase amount of the intake-air so that the value of the increase amount of the engine speed becomes a proper value.

Figure 7:
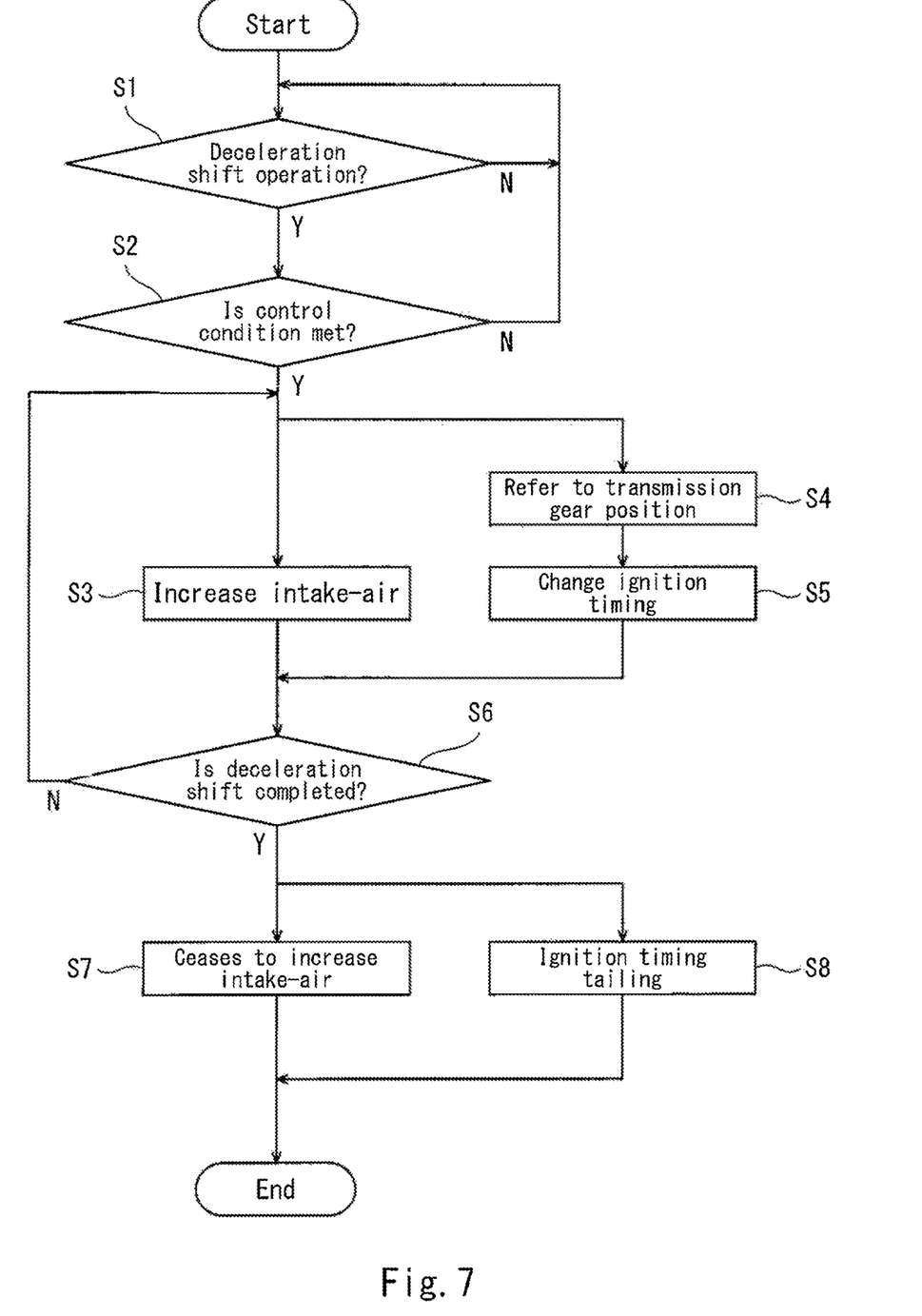
FIG. 7 is a flowchart showing a flow of the automatic downshift control performed by the controller of FIG. 3.

FIG. 7 is a flowchart showing a flow of the automatic downshift control performed by the controller 12 of FIG. 3. Referring to FIG. 7, in a case where a power supply of the motorcycle 1 is ON, the controller 12 determines whether or not the rider has performed the deceleration (speed reduction) shift operation based on the detection signal of the shift operation sensor 24 (step S1). In a case where the controller 12 determines that the rider has performed the deceleration shift operation in step S1, the controller 12 determines whether or not a control condition for the automatic downshift control is met (step S2). This control condition includes a condition in which a traveling speed of the motorcycle 1 is higher than a first threshold (e.g., 20 km/h), the engine speed is higher than a second threshold (e.g., 1000 rpm) and lower than a third threshold (10000 rpm), and the throttle opening rate of the throttle device 26 is less than a fourth threshold (e.g., 90% of the opening rate at a fully open position of the throttle valve).

In a case where the controller 12 determines that the control condition for the automatic downshift control is not met in step S2, the controller 12 returns to step S1. On the other hand, in a case where the controller 12 determines that the control condition for the automatic downshift control is met in step S2, the controller 12 controls the throttle device 26 to increase the intake-air amount with reference to the correlation of FIG. 5 (step S3), refers to a present (current) transmission gear position detected by the gear position sensor 23 (step S4), and retards the ignition timing according to the rule of FIG. 6 (step S5). Then, the controller 12 determines whether or not the deceleration (speed reduction) shift operation has been completed based on the detection signal from the gear position sensor 23 (step S6).

In a case where the controller 12 determines that the deceleration shift operation has not been completed in step S6, the controller 12 repeats step S3 and step S5. On the other hand, in a case where the controller 12 determines that the deceleration shift operation has been completed in step S6, the controller 12 ceases to increase the intake-air amount of the engine E to return the throttle opening rate to one in a normal state (non-speed-change state) (step S7). In addition, the controller 12 performs a tailing control for the ignition timing so that the ignition timing gradually returns to one in the normal state over time, to suppress a power change at a time point just after the completion of the deceleration shift operation. Note that if a next deceleration shift operation occurs (step S1) in the middle of the tailing control, the controller 12 terminates the tailing control, and performs step S2 to step S5.

In accordance with the above-described configuration, since the controller 12 causes the throttle device 26 to adjust the intake-air amount and causes the ignition device 27 to adjust the ignition timing to increase the power of the engine E in the deceleration (speed reduction) shift, it becomes possible to adjust the engine power with a high responsivity by the ignition timing adjustment which is high in power responsivity while sufficiently addressing a great change of the target engine power by the intake-air amount adjustment. This allows the rider to smoothly perform the speed change operation irrespective of the transmission gear position. As a result, smooth deceleration (speed reduction) shift can be performed without operating a main clutch.

In addition, since the engine power reaches the target power by increasing the intake-air amount and changing the phase of the ignition timing, in the deceleration (speed reduction) shift, the engine power can be easily finely adjusted, and smoothness of the deceleration (speed reduction) shift can be improved. In a case where the transmission gear ratio difference $\Delta R$ in the deceleration (speed reduction) shift, is maximum($\Delta R_{max}$), the controller 12 increases the intake-air amount without changing the ignition timing. In cases where the transmission gear ratio difference $\Delta R$ is not $\Delta R_{max}$, the controller 12 retards the ignition timing. Therefore, in a case where the phase of the ignition timing is changed in the deceleration shift, a retard range of the ignition timing which is a wide allowable range is used without using an advancement range of the ignition timing which is a narrow allowable range. Thus, a great adjustment width of the ignition timing can be secured.

Embodiment 2

Figure 8:
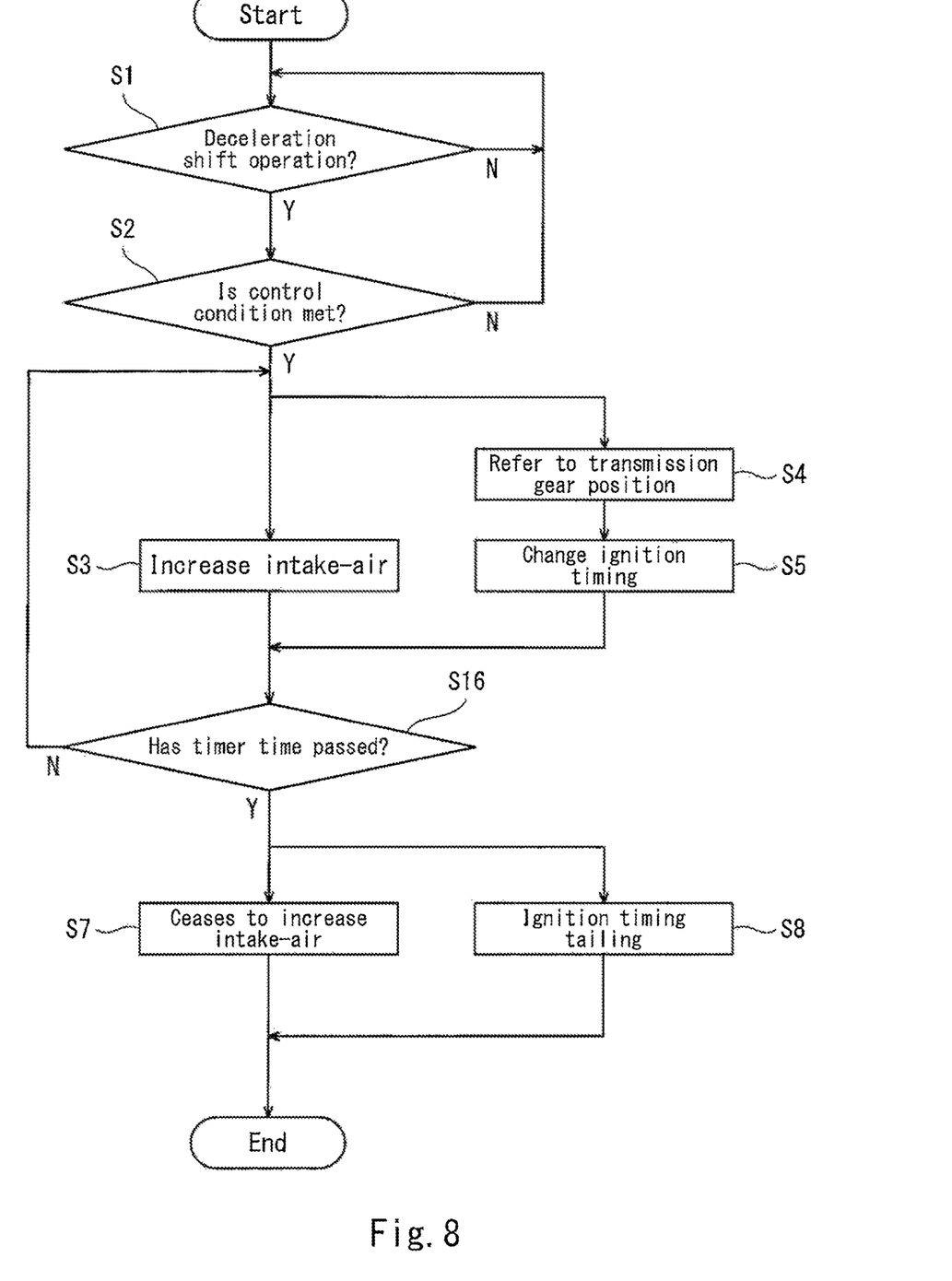
FIG. 8 is a flowchart showing a flow of an automatic downshift control of a motorcycle according to Embodiment 2.

FIG. 8 is a flowchart showing a flow of an automatic downshift control of a motorcycle according to Embodiment 2. Referring to FIG. 8, steps S1 to S5, S7 and S8 are the same as those of Embodiment 1 and will not be described in detail. During the automatic downshift control in steps S3 and S5, the controller 12 determines whether or not predetermined timer time (e.g., 0.5 second) has passed (step S16). In a case where the controller 12 determines that the predetermined timer time has not passed in step S16, the controller 12 continues the automatic downshift control. On the other hand, in a case where the controller 12 determines that the predetermined timer time has passed in step S16, the controller 12 moves to steps S7 and S8 to terminate the automatic downshift control.

In accordance with this configuration, since the timer time is set to be a little longer than assumed time required to perform the deceleration shift, the power change at a time point just after the completion of the deceleration (speed reduction) shift can be suppressed, and smoothness of the deceleration shift can be further improved. The other steps are the same as those of Embodiment 1 and will not be described in repetition.

The present invention is not limited to the above-described embodiments, and its configurations may be changed, added or deleted. For example, instead of setting the value of the increase amount of the intake-air according to as the reference the deceleration shift from the 2nd gear position to the 1st gear position, at which the transmission gear ratio difference $\Delta R$ is maximum ($\Delta R_{max}$), the value of the increase amount of the intake-air may be set according to as the reference the deceleration shift from the 3rd gear position to the 2nd gear position, at which the transmission gear ratio difference $\Delta R$ is second largest. In that case, the ignition timing may be advanced, only in a case where the transmission gear ratio difference $\Delta R$ in the deceleration (speed reduction) shift, is $\Delta R_{max}$ (the deceleration shift from the 2nd gear position to the 1st gear position), and may be retarded in other cases (the deceleration shift from the 6th gear position to the 5th gear position, from the 5th gear position to the 4th gear position, and from the 4th gear position to the 3rd gear position). Further, the value of the increase amount of the intake-air may be set according to as the reference a case where the transmission gear ratio difference $\Delta R$ is minimum ($\Delta R_{min}$) (e.g., the deceleration shift from the 6th gear position to the 5th gear position), and the ignition timing may be advanced and the intake-air amount may be increased in other cases (the transmission gear ratio difference $\Delta R$ is not minimum ($\Delta R_{min}$). Further, the number of times of ignition may be reduced, instead of retarding the ignition timing. Moreover, in a case where a sensor which cannot detect the operation direction of the shift operation member 9 is used as the shift operation sensor 24, the operation direction of the shift operation member 9 may be detected with reference to the detection signal of the gear position sensor 23.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

What is claimed is:

1. A vehicle with an automatic downshift function, the vehicle comprising:
   an engine including a throttle device and an ignition device;
   an engine speed sensor which detects an engine speed;
   a shift operation member which is operated by a rider to perform speed change;
   a manual transmission connected to the engine, the manual transmission being configured to select one of gears corresponding to a plurality of transmission gear positions, respectively, in response to an operation of the shift operation member performed by the rider, and to place the selected gear in a driving power transmission state;
   a shift operation sensor which detects the operation of the shift operation member performed by the rider;
   a gear position sensor which detects a transmission gear position selected from among the plurality of transmission gear positions, and
   a controller which controls the engine based on a detection signal of the engine speed sensor, a detection signal of the gear position sensor, and a detection signal of the shift operation sensor, wherein
   the controller performs an automatic downshift control, and
   in the automatic downshift control:
     in a case where the controller determines that a deceleration shift operation has been initiated based on the detection signal of the shift operation sensor, the controller controls the throttle device to increase an intake-air amount of the engine and controls the ignition device to change an ignition timing, based on the engine speed detected by the engine speed sensor, and
     in a case where the controller determines that a deceleration shift movement of the manual transmission has been completed based on the detection signal of the gear position sensor, the controller controls the ignition device to return the ignition timing to one in a normal state.

2. The vehicle with the automatic downshift function according to claim 1,
   wherein in a case where the controller determines that the deceleration shift movement of the manual transmission has been completed, the controller controls the ignition device so that the ignition timing returns to an ignition timing in the normal state over time.

3. A vehicle with an automatic downshift function, the vehicle comprising:
   an engine including a throttle device and an ignition device;
   an engine speed sensor which detects an engine speed;
   a shift operation member which is operated by a rider to perform speed change;
   a manual transmission connected to the engine, the manual transmission being configured to select one of gears corresponding to a plurality of transmission gear positions, respectively, in response to an operation of the shift operation member performed by the rider, and to place the selected gear in a driving power transmission state;
   a shift operation sensor which detects the operation of the shift operation member performed by the rider;
   a gear position sensor which detects a transmission gear position selected from among the plurality of transmission gear positions; and
   a controller which controls the engine based on a detection signal of the engine speed sensor and a detection signal of the shift operation sensor, wherein
   the controller performs an automatic downshift control, and in the automatic downshift control, in a case where the controller determines that a deceleration shift operation has been initiated based on the detection signal of the shift operation sensor, the controller controls the throttle device to increase an intake-air amount of the engine based on the engine speed detected by the engine speed sensor without reference to the transmission gear position detected by the gear position sensor, and controls the ignition device to change an ignition timing based on the transmission gear position detected by the gear position sensor.

4. A vehicle with an automatic downshift function, the vehicle comprising:

an engine including a throttle device and an ignition device;

an engine speed sensor which detects an engine speed;

a shift operation member which is operated by a rider to perform speed change;

a manual transmission connected to the engine, the manual transmission being configured to select one of gears corresponding to a plurality of transmission gear positions, respectively, in response to an operation of the shift operation member performed by the rider, and to place the selected gear in a driving power transmission state;

a shift operation sensor which detects the operation of the shift operation member performed by the rider;

a gear position sensor which detects a transmission gear position selected from among the plurality of transmission gear positions; and a controller which controls the engine based on a detection signal of the engine speed sensor, a detection signal of the gear position sensor and a detection signal of the shift operation sensor, wherein in a case where the controller determines that a deceleration shift operation has been initiated, the controller controls the ignition device to change a phase of an ignition timing, and decides a phase change amount of the ignition timing based on the transmission gear position detected by the gear position sensor.

5. The vehicle with the automatic downshift function according to claim 4, wherein the controller changes a phase of the ignition timing by retarding the ignition timing, and increases a retard amount of the ignition timing as the transmission gear position in deceleration shift is higher.

6. The vehicle with the automatic downshift function according to claim 4, wherein in a case where a transmission gear ratio difference in deceleration shift is maximum, the controller controls the throttle device to increase an intake-air amount of the engine without changing the ignition timing of the ignition device, and wherein in a case where the transmission gear ratio difference in the deceleration shift is not maximum, the controller controls the ignition device to retard the ignition timing.

7. A vehicle with an automatic downshift function, the vehicle comprising:

an engine including a throttle device and an ignition device;

an engine speed sensor which detects an engine speed;

a shift operation member which is operated by a rider to perform speed change;

a manual transmission connected to the engine, the manual transmission being configured to select one of gears corresponding to a plurality of transmission gear positions, respectively, in response to an operation of the shift operation member performed by the rider, and to place the selected gear in a driving power transmission state;

a shift operation sensor which detects the operation of the shift operation member performed by the rider;

a gear position sensor which detects a transmission gear position selected from among the plurality of transmission gear positions; and a controller which controls the engine based on a detection signal of the engine speed sensor, a detection signal of the gear position sensor and a detection signal of the shift operation sensor, wherein in a case where a predetermined control condition is met, the controller performs an automatic downshift control, the predetermined condition includes a condition in which a speed of the vehicle is higher than a first threshold, the engine speed is higher than a second threshold and lower than a third threshold, and a throttle opening rate of the throttle device is less than a fourth threshold, and in the automatic downshift control, in a case where the controller determines that a deceleration shift operation has been initiated based on the detection signal of the shift operation sensor, the controller controls the throttle device to increase an intake-air amount of the engine and controls the ignition device to change an ignition timing, based on the engine speed detected by the engine speed sensor.

* * * * *